C. RUDICH.
ADJUSTABLE TWIN SAW.
APPLICATION FILED FEB. 25, 1918. RENEWED JAN. 6, 1922.
1,426,676.
Patented Aug. 22, 1922.
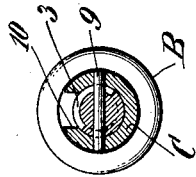
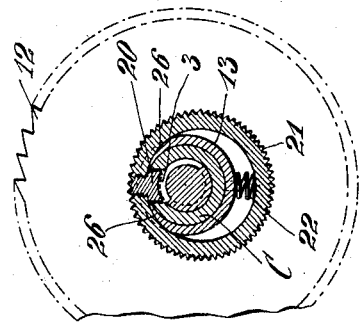
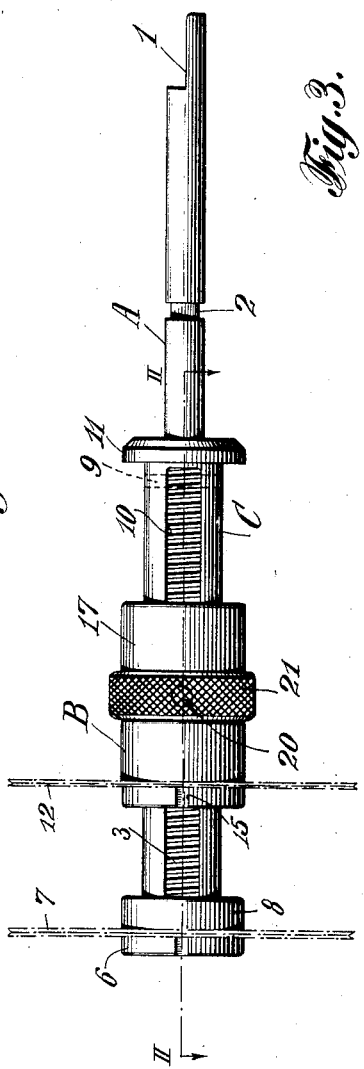
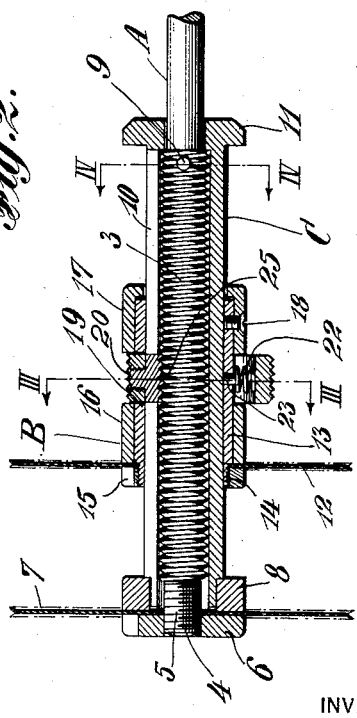
INVENTOR
Charles Rudich
BY
his ATTORNEY

UNITED STATES PATENT OFFICE.

CHARLES RUDICH, OF NEW YORK, N. Y., ASSIGNOR, BY MESNE ASSIGNMENTS, TO THE KNY-SCHEERER CORPORATION OF AMERICA, OF NEW YORK, N. Y., A CORPORATION OF NEW YORK.

ADJUSTABLE TWIN SAW.

1,426,676.

Specification of Letters Patent. Patented Aug. 22, 1922.

Application filed February 25, 1918, Serial No. 219,011. Renewed January 6, 1922. Serial No. 527,517.

*To all whom it may concern:*

Be it known that I, CHARLES RUDICH, a subject of the Emperor of Austria, and a resident of New York city, county and State of New York, have invented certain new and useful Improvements in Adjustable Twin Saws, set forth in the following specification.

This invention relates to tools employed in bone surgery. The object of the invention is to improve the means for adjusting and operatively mounting a surgical saw, and more particularly the relative mounting and adjusting of twin saws.

An illustrative embodiment of the invention is described in the following specification in connection with the accompanying drawings, which form a part hereof, in which like characters designate corresponding parts in the several figures, and in which Figure 1 is a side elevation of the complete tool;

Figure 2 is a fragmentary section along line II—II of Figure 1;

Figure 3 is a section through line III—III of Figure 2; and

Figure 4 is a section through line IV—IV of Figure 2.

A rotary chuck shank A, having any suitable formation such as 1 and 2 to cooperate with a tool chuck, is preferably provided with threads 3 for a purpose presently to be described. These threads may be readily cut directly into the stock from which the shank A is being fabricated, although their purpose is to form a tooth portion for anchoring the saw carriage B. The free end 4 of the shank A has threads 5 to cooperate with the nut 6 for operatively mounting the saw 7 against the holder 8. The holder 8 is shown seated in a rabbet formed at the end of the guide sleeve C, which embraces the threaded portion 3 of the shank A and which should be anchored thereto in any suitable manner, as by a pin 9. The guide sleeve C is formed with a longitudinal channel 10 and preferably with a flange 11. The carriage B provides an adjustable mounting for the second saw 12 and is formed of an inner sleeve 13 fitting slidably upon a guide sleeve C and having a threaded end 14 to cooperate with the nut 15 for operatively mounting the saw 12. Back of the saw 12 is an outer ring 16, anchored in any suitable manner to the inner sleeve 13. Over the opposite end of the inner sleeve 13 is a second ring 17, anchored in any suitable manner to the inner sleeve 13, as by a screw 18. The inner sleeve 13 has a perforation 19 to permit the entrance of the block 20, which is preferably fixed to a movable ring 21, which surrounds the inner sleeve 13, between the two rings 16 and 17. This ring 21 is normally forced into an eccentric position by a spring 22 held in position by the pin 23, so that the block 20 is normally forced through the longitudinal channel 10 against what in effect are teeth provided by the threads 3. The inner face of the block 20 likewise is formed with teeth 25 to cooperate with the threads 3. On the side opposite the spring 22 the inner sleeve 13 has bevelled portions 26 to accommodate the eccentric position for the ring 21. The block 25 prevents relative rotation between the carriage and the guide sleeve C, and when its teeth are engaged with the threads 3 no longitudinal or axial movement of the carriage B can take place. Finger pressure upon the ring 21 in a direction against the force of the spring 22 releases the block 20 from the teeth 3 and permits the carriage B to be adjusted axially to the desired position, in which it is locked when pressure is removed from the ring 21.

What I claim and what I desire to secure by United States Letters Patent is:—

1. An adjustable multiple saw-tool comprising a rotary chuck-shank; a guide-sleeve fixed to said shank and having a longitudinal locking channel; a carriage for mounting a circular saw slidable on said sleeve; teeth formed crosswise at the base of said channel; and a releasable spring-pressed toothed block passing through said channel locking said carriage against relative rotation and permitting the axial adjusting and fixing of said carriage.

2. In combination in a tool-holder, a threaded shank; a sleeve fitted over said threaded shank and having a longitudinal channel giving access to portions of the threads of said threaded shank; a carriage riding on said sleeve; and a radially movable toothed member anchored to said carriage and passing through said channel to interlock with the threads of said shank.

3. An adjustable surgical twin-saw comprising a single shank-member mounting two spaced circular saws, the mounting of one saw comprising a carriage having interior axially extensive guide-surfaces and a radially movable axial locking means; said shank-member having an axially continuous guide-way for said carriage and a separated gripping means to cooperate with the said locking means of said carriage to fix said carriage in any one of various axial positions.

4. An adjustable, multiple saw tool comprising a rotary chuck-shank; a saw mounting at one end of said shank; screw-threads provided on said shank back of said mounting; a guide-sleeve having an axial or longitudinal slot mounted on said shank back of said mounting; a carriage having a saw mounting slidably engaging said guide-sleeve; and a finger releasable means penetrating said slot to prevent relative rotation between said carriage and said spindle and operative to engage said threaded portion to prevent axial motion.

In testimony whereof I have signed my name to this specification, this 18th day of February, 1918.

CHARLES RUDICH.